United States Patent

[11] 3,563,329

| [72] | Inventor | Vincent Licari |
| | | Saint Joseph, Mich. |
| [21] | Appl. No. | 715,335 |
| [22] | Filed | Mar. 22, 1968 |
| [45] | Patented | Feb. 16, 1971 |
| [73] | Assignee | Clark Equipment Company |

[54] VEHICLE TRACTOR UNIT
4 Claims, 5 Drawing Figs.

[52] U.S. Cl. .................................................. 180/12, 180/51
[51] Int. Cl. ..................................................... B06d 7/00; B62d 49/06, B62d 53/04
[50] Field of Search .......................................... 180/51, 50, 52, 11, 12, 14, 41, 53.6; 280/6, 43.23

[56] References Cited
UNITED STATES PATENTS

| 3,478,833 | 11/1969 | Breon et al. ................ | 180/12 |
| 1,613,681 | 1/1927 | Thompson.................... | 180/12 |
| 2,422,813 | 1/1947 | Walch ......................... | 180/41X |
| 2,636,568 | 4/1953 | Rutishauser................. | 180/53(.6) |
| 2,636,746 | 4/1953 | Meldrum..................... | 280/43.23X |
| 3,326,312 | 6/1967 | Buller.......................... | 180/51X |
| 3,334,702 | 8/1967 | Granryd ...................... | 180/51 |

FOREIGN PATENTS

| 1,197,434 | 6/1959 | France ......................... | 180/12 |

Primary Examiner—A. Harry Levy
Attorneys—Kenneth C. Witt, John C. Wiessler, Robert H. Johnson and Reginald J. Falkowski

ABSTRACT: A tractor unit for connection to an implement unit to form a complete vehicle, the tractor unit having a body portion, a pair of drive wheels, a connection portion pivotally connected to the body portion, and a pair of retractable auxiliary wheels mounted on the connection portion for use in maneuvering the tractor unit into position for coupling it to an implement unit.

PATENTED FEB 16 1971
3,563,329
SHEET 1 OF 2
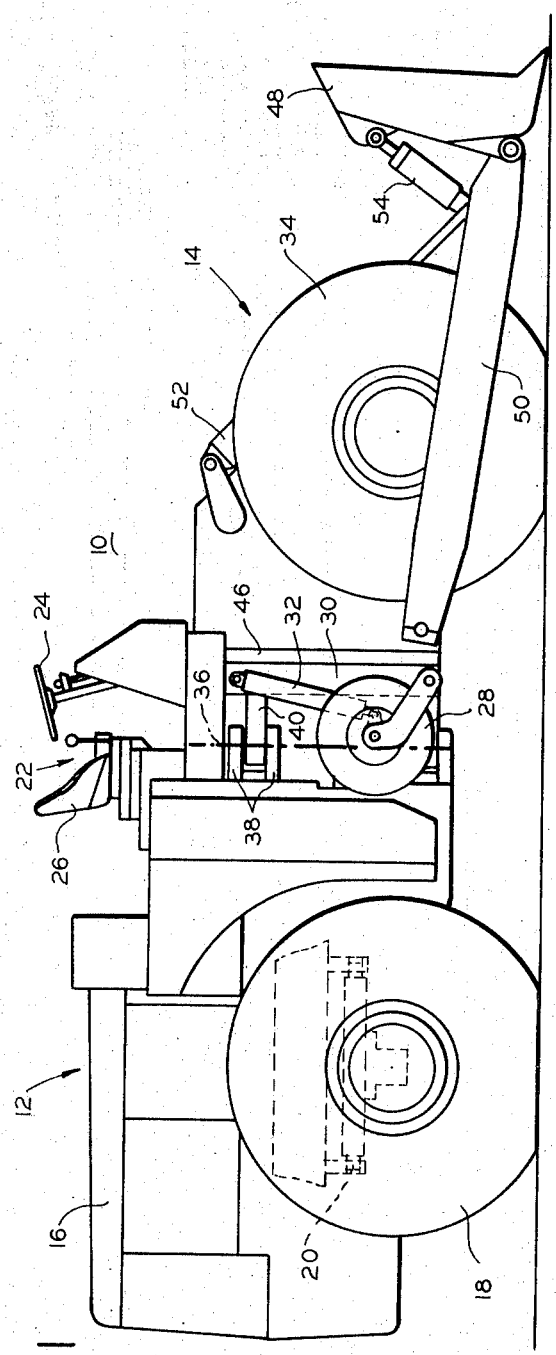
FIG. 1
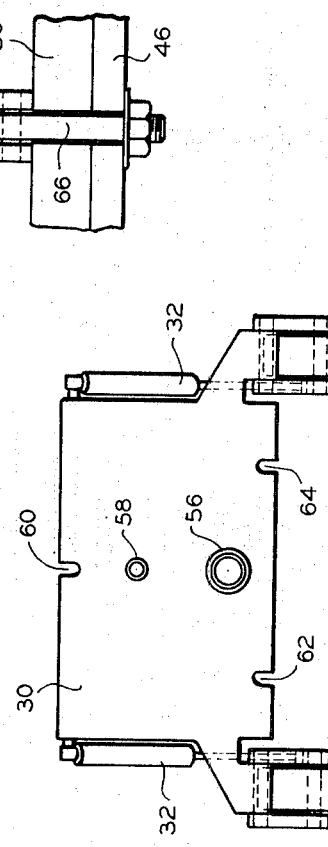
FIG. 4
FIG. 3
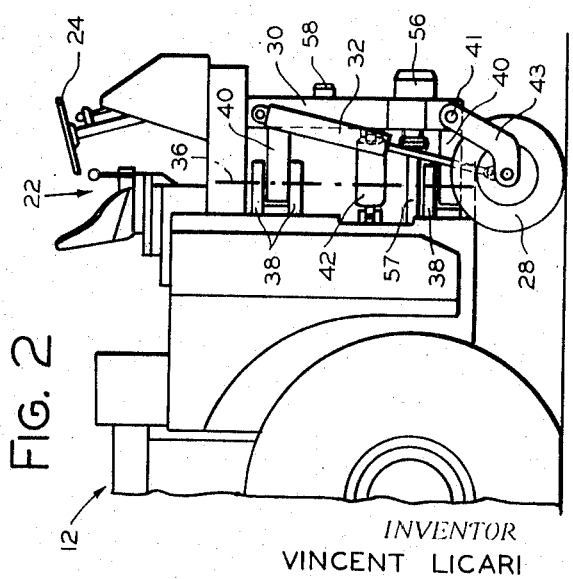
FIG. 2
INVENTOR
VINCENT LICARI
BY Kenneth C. Witt
ATTORNEY

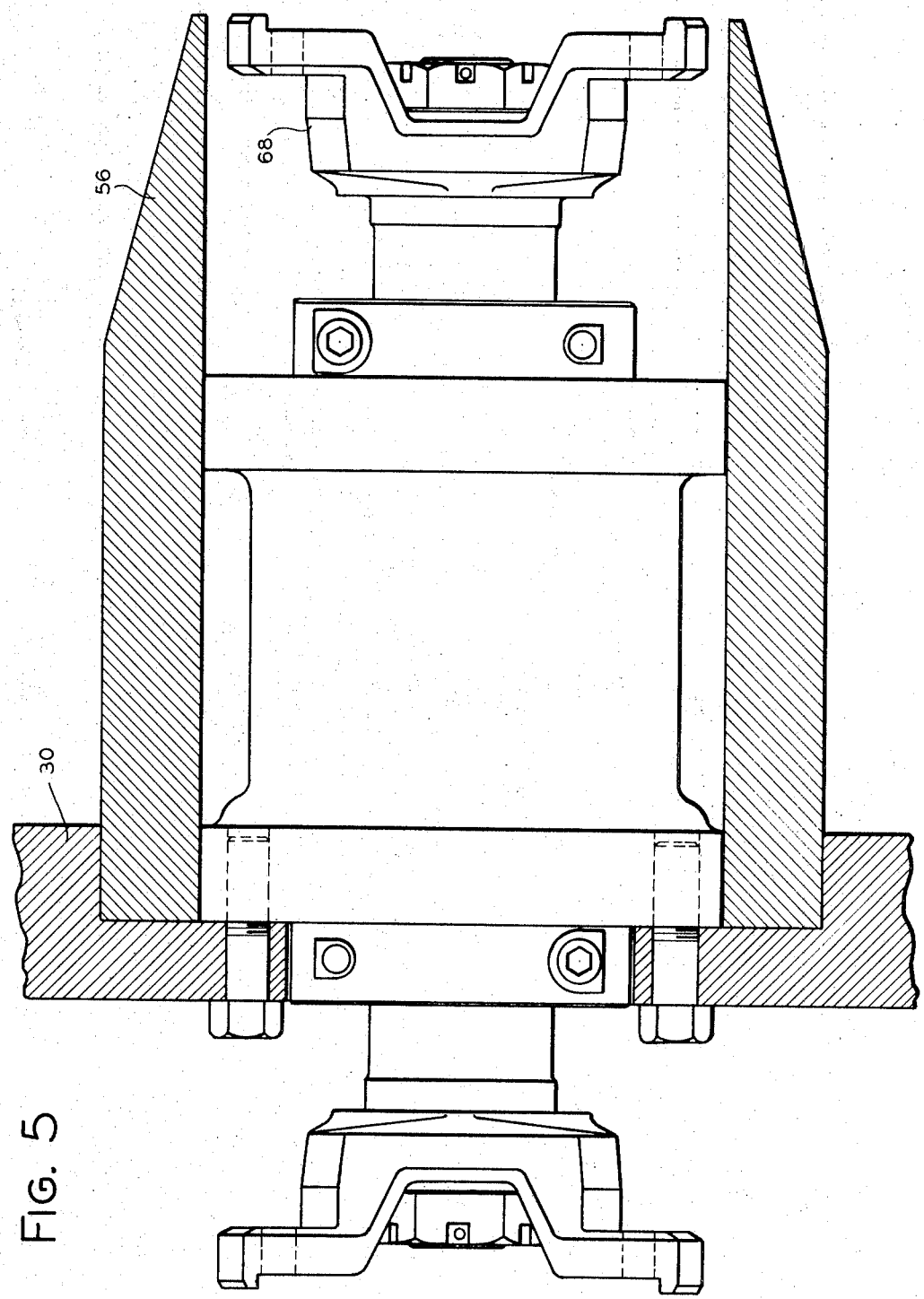

3,563,329

VEHICLE TRACTOR UNIT

BACKGROUND OF THE INVENTION

It is known to connect both two-wheel and four-wheel tractors with various implement units to form complete vehicles for performing a variety of operations. The present invention is directed to a tractor unit which has two drive wheels, and only these two wheels are in contact with the ground and are operative during operation of the tractor unit when it is coupled with an implement unit.

One disadvantage of the construction of the prior art is that if it is attempted to join the tractor unit and the implement unit on ground which is not level it may be very difficult to align the two units so as to couple them together. This could require considerable time, perhaps the use of auxiliary tools or devices of some kind, and most likely the services of two or more men.

Another disadvantage of the construction of the prior art may be that it is necessary to add some additional parts in order to steer the auxiliary wheels when the tractor unit is operating separately and is to be negotiated into position to be coupled with an implement unit, and then before the two units can be connected together it is necessary to again remove such additional parts.

The present invention overcomes both of these disadvantages in a manner specified in detail hereinafter.

SUMMARY OF THE INVENTION

In carrying out my invention in one preferred form thereof I provide a tractor unit which has a body portion, a pair of drive wheels supporting the body portion, a connection portion located at one end of the body portion and pivotally connected about a vertically disposed axis to the body portion, and a pair of retractable auxiliary wheels mounted on the connection portion.

BRIEF DESCRIPTION OF THE DRAWING

FIG. 1 shows a side elevation of a vehicle embodying the tractor unit of the present invention coupled to an implement unit, FIG. 2 is a partial view of the tractor unit only, FIG. 3 is a partial elevational view of the connection end of the tractor unit, FIG. 4 illustrates one form connection between the tractor unit and the implement unit, and FIG. 5 is a fragmentary sectional view illustrating a hollow alignment deice and a portion of a drive shaft housed therein.

DESCRIPTION OF A PREFERRED EMBODIMENT

Referring to FIG. 1 of the drawing there is shown a complete vehicle which is indicated generally by the numeral 10 and is composed of two separable parts, a tractor unit indicated by the numeral 12 and an implement unit indicated by the numeral 14. The implement unit illustrated is a bulldozer implement which when coupled to the tractor unit makes a complete bulldozer vehicle for the movement of dirt or other material by pushing, but it will be readily understood that other implement units such as loaders, fork lifts, scrapers, dirt carriers, rollers and others may be utilized instead of the bulldozer implement illustrated. One of the big advantages of the tractor unit disclosed and claimed herein is that it can be coupled with a variety of implement units to form a variety of different vehicles for the performance of many different specialized tasks.

The tractor unit 12 comprises a body portion 16 which houses an engine (not shown) which is connected through a suitable transmission and axle and other power train components to drive a pair of main drive wheels 18. Only one wheel 18 is visible in FIG. 1, but it will be readily understood that there is a wheel 18 mounted at each end of the main axle in the usual manner. As indicated schematically at 20 the axle on which wheels 18 are mounted is pivotally mounted to pivot about a longitudinal, horizontally disposed axis to provide for irregularities in the terrain, and together with the vertical steering coupling between the tractor unit and the implement unit, to be described, provides an articulated vehicle. The vehicle is equipped with an operators's station indicated generally by the numeral 22 which includes a steering wheel 24, a seat 26 and various levers and other devices as necessary to operate the vehicle.

FIG. 2 shows the tractor unit only of the vehicle separated from the implement unit. The tractor unit 12 is equipped with auxiliary wheels 28. Only one of these is visible in FIGS. 1 and 2 of the drawing but both may be seen in FIG. 3 of the drawing which shows an end elevation of the connection plate or portion of the vehicle which is utilized to connect the tractor unit to the implement unit. When the two units are connected together to form a complete vehicle the auxiliary wheels 28 are retracted to the position illustrated in FIG. 1 by means of a pair of hydraulic actuators 32 which are remotely controlled from the operator's station 22. These wheels are individually infinitely adjustable to any desired position between the fully extended position illustrated in FIG. 2 and the retracted position illustrated in FIG. 1 and the significance of this is discussed in detail later.

When the tractor unit 12 and the implement unit 14 are connected together to form a complete vehicle as in FIG. 1 the vehicle may have four wheel drive, that is, the wheels 34 (only one of which is visible) of the implement unit may be driven from the engine in the tractor unit 12 in a manner which is described in greater detail hereinafter. The vehicle 10 is steered by means of a combined draft and steering coupling arrangement which permits the implement unit to pivot with respect to the tractor unit about a vertically disposed axis which is indicated by the numeral 36. The vertical pivot connection comprises a pair of bifurcated brackets 38, the lowermost one of which is best seen in FIG. 2, which brackets project outwardly from the body portion 16 of the tractor unit. Mating bracket portions 40 project from the plate 30 between the bifurcated portions of brackets 38 and are secure thereto by means of suitable pivot pins which are not visible in the drawing. The plate 30 is pivoted about the vertically disposed axis 36 by means of a pair of hydraulic actuators 42 connected between the body portion 16 and the plate 30. Only one of these is visible in FIG. 2 of the drawing, but it will be readily understood that there is a steering actuator 42 adjacent each side of the machine, and these are actuated in the usual manner by remote control from the operator at his station 22 to extend one and retract the other or vice versa in order to cause the plate 30 to pivot in the desired manner with respect to body portion 16 about axis 36.

If the two parts of the vehicle are coupled together as in FIG 1, such pivoting action about axis 36 permits the entire vehicle to be steered and maneuvered by the operator utilizing steering wheel 24 in the usual manner. If the tractor unit 12 is disconnected from the implement unit and the auxiliary wheels 28 are extended in the manner illustrated in FIG. 2, it is possible then to maneuver the tractor unit only by operation of the operator's steering wheel 24 in the same manner. It will be understood that the wheels 28 are auxiliary wheels and are intended only for the purpose of maneuvering the tractor unit 12 into position for coupling it to an implement unit after which the wheels 28 are retracted, to the position illustrated in FIG. 1, and are no longer operative. It will be further understood that it is very advantageous to have auxiliary wheels such as wheels 28 to provide for the movement of the tractor unit 12 under its own power, that is, utilizing its engine driving wheels 18, to maneuver it into position for coupling to an implement unit, because without such auxiliary wheels a crane and/or other heavy equipment would be required in order to handle such a tractor unit and couple it to the implement unit; without auxiliary wheels 28 tractor unit 12 could not maneuver alone under its own power.

The auxiliary wheels 28 are mounted on links 43 which are pivotally connected at 41 on the connection plate 30, and linear hydraulic actuators 32 are provided to extend and retract the auxiliary wheels 28 under control of the operator. Each of the auxiliary wheels 28 can be positioned at any desired location intermediate its extreme extended and retracted positions, and the two auxiliary wheels can be extended and retracted individually to assist in maneuvering the tractor unit into position for coupling it to the implement unit.

The implement unit has a connection plate 46 which abuts connection plate 30 of the tractor unit when the two units are coupled together, and the particular implement unit illustrated also includes a bulldozer blade 48, main boom arms 50 on which the bulldozer blade is mounted, an actuator 52 for raising and lowering the bulldozer blade, and another actuator 54 for adjusting the pitch of the bulldozer blade. However, as mentioned previously, this is merely illustrative of one type of implement of which may be coupled to and utilized with the tractor unit 12 to form a complete vehicle.

The implement unit 14, when it is disconnected from the tractor unit, ordinarily will be supported in such a manner that the connection plate 46 is elevated above the ground sufficiently that it is possible to bring the connection plate 30 of the tractor unit into abutting relation with connection plate 46. With the bulldozer unit illustrated the implement would automatically assume such a position upon disconnection from the tractor unit, although with other types of implements it may be necessary to make provision for supporting the end of the implement adjacent the connection plate 46 so that the latter is elevated sufficiently to make connection to the tractor unit possible. However, the present invention makes the location of connection plate 46 and the general character of the terrain upon which the connection is to be made much less critical than otherwise would be the case because of the connection features to be explained and the manner in which the tractor unit 12 can be maneuvered.

Projecting from the front of the connection plate 30 is a pilot projection member or alignment device 56 which preferably has a beveled leading edge as illustrated. The connection plate 46 on the implement unit has a mating circular opening as will be readily understood. The initial step in joining the two units to form a complete vehicle is to engage the projection 56 in the said opening in plate 46 by driving the tractor unit forwardly under its own power and at the same time raising or lowering the auxiliary wheels 28 as necessary to achieve such engagement. It will be appreciated that the operator is located immediately above the projection 56 and can thus observe the relative locations of the projection 56 and the opening which it is to enter and without additional assistance can achieve such engagement. Then, if necessary, he can raise or lower the connection plate 30 and the entire front end of the tractor unit, which also raises or lowers the connection plate 30 and the end of the implement unit until the two connection plates are approximately parallel. At the same time he can move connection plate 30 circumferentially with respect to connection plate 46 by raising or lowering only one of the auxiliary wheels 28 or raising one and lowering the other. Because of the horizontal pivotal connection between the main axle which carries wheels 18 and body portion 16 such movement of the connection plate 30 and the consequent pivoting of the body portion of the tractor unit is made possible. In this manner the operator alone can align a secondary pilot projection or alignment device 58 on connection plate 30 with another mating opening in projection plate 46. When this has been achieved the operator knows that the two units are in proper alignment and he can then drive the tractor unit forwardly sufficiently that the two connection plates abut each other firmly, after which he can secure them together in a suitable manner by a swing type latch bolt 66 as illustrated in FIG. 4 of the drawing. In the form of the invention illustrated there are three of these, one at the top center in the location indicated by the numeral 60 and two at the bottom at the locations indicated by the numerals 62 and 64, but it will be appreciated that other connection means may be utilized if desired.

If the implement unit has wheels which are to be driven as is illustrated in the present embodiment, the drive shaft of the implement must then be connected to the shaft of the tractor unit which is to drive same, and FIG. 5 illustrates how these two drive shaft sections come together within projection 56 and may be readily coupled by the operator. Coupling portion 68 is housed within and protected by projection 56 and is arranged to be driven through a suitable universal joint and shaft 57 by the transmission of the tractor unit, while a mating coupling portion on the implement unit need only be connected to coupling 68 in order to provide for the operation of the wheels on the implement unit to provide a four wheel drive vehicle. If the implement unit 14 requires connections also to the hydraulic circuit of the tractor unit such connections also can be readily made by the operator in a known manner, as can brake connections and any other connections which may be required, and the complete vehicle 10 then is ready for operation.

It will be appreciated that the joining operation of the tractor unit and the implement unit just described can be accomplished by one man in a short time and on unfavorable terrain, thus making it possible readily to shift the tractor unit from one implement unit to another in a minimum of time with a minimum of difficulty and on ground which need not necessarily be level. It will be readily understood also that the reverse of the procedure described is followed in disconnecting the tractor unit from the implement unit.

While I have illustrated and described herein a preferred embodiment of my invention it will be appreciated that modifications may be made. For example, it will be readily understood by those skilled in the art that it would be possible to employ skid shoes instead of the auxiliary wheels 28, and even though auxiliary wheels are referred to in the appended claims it should be understood that it is intended by such terminology to cover also equivalents thereof such as skid shoes. I intend to cover by the appended claims all modifications falling within the true spirit and scope of my invention.

I claim:

1. A tractor unit for a vehicle comprising a body portion, a pair of drive wheels supporting said body portion, a connection portion located at one end of said body portion and pivotally connected about a vertically disposed axis to the body portion, a pair or of retractable auxiliary wheels mounted on the said connection portion, the said retractable auxiliary wheels being individually infinitely adjustable between fully extended and fully retracted positions, two alignment devices on the said connection portion for use in aligning the tractor unit with an implement unit prior to connection thereto, one of the said two alignment devices being hollow and containing a portion of a drive shaft for transmitting power between the tractor unit and the implement unit.

2. A vehicle comprising a tractor unit detachably connected to an implement unit, the tractor unit comprising a body portion, a pair of drive wheels supporting said body portion, a connection portion located at one end of said body portion and pivotally connected about a vertically disposed axis to the body portion, and a pair of retractable auxiliary wheels mounted on the said first connection portion, the implement unit comprising a pair of wheels and a second connection portion connected to the said first connection portion, the said first and second connection portions having aligned openings therethrough, and a drive shaft extending through the said openings for connection to said implement unit.

3. A vehicle as specified in claim 2 in which the said first connection portion comprises a connection plate with an outwardly extending pilot projection thereon, and the said second connection portion includes a mating opening for receiving the said pilot projection.

4. A vehicle as specified in claim 2 in which the said first connection portion comprises a connection plate with a pair of outwardly projecting pilot projections thereon, the said second connection portion includes a pair of mating opening for receiving the said pilot projections respectively, and one of the said pilot projections is hollow and together with one of said mating openings, constituting said aligned openings through which said drive shaft extends.